11/8/83 XR 4,414,467

United States Patent [19]

Gould et al.

[11] 4,414,467

[45] Nov. 8, 1983

[54] VENDING ORDERING TERMINAL

[75] Inventors: George K. Gould, Pound Ridge; Eric Steinberg, Bronx, both of N.Y.

[73] Assignee: Video Corporation of America, New York, N.Y.

[21] Appl. No.: 278,852

[22] Filed: Jun. 29, 1981

Related U.S. Application Data

[63] Continuation-in-part of Ser. No. 93,085, Nov. 13, 1979, Pat. No. 4,300,040.

[51] Int. Cl.[3] .............. G06K 5/00

[52] U.S. Cl. .............. 235/381; 235/379; 235/380

[58] Field of Search .............. 235/379, 381, 380; 340/825.35, 825.31; 194/4, 15; 221/2

[56] References Cited

U.S. PATENT DOCUMENTS

| | | | |
|---|---|---|---|
| 3,224,544 | 12/1965 | Shoher | 194/15 |
| 3,718,906 | 2/1973 | Lightner | 235/381 |
| 4,134,537 | 1/1979 | Glaser | 235/379 |

*Primary Examiner*—Harold I. Pitts

[57] ABSTRACT

A terminal is provided at which a user can selectively preview or order a videocassette. The terminal comprises customer identification means for receiving information relative to the user; mode selection means enabling the user to choose a preview or order mode; cassette selection means for selecting and identifying a desired videocassette; terminal control means including a memory coupled to the customer identification means and the cassette selection means to receive and store information representative of the user, the data, and the selected videocassettes. Vending means are provided for storing a plurality of videocassettes and for selectively vending the selected videocassette; and vending control means are coupled to the terminal control means for communicating the information between the memory and the vending means to command the vending of the selected videocassette when the order mode has been selected. Preview display means coupled to the terminal control means receive the information and display a trailer corresponding to the selected videocassette when the preview mode has been selected.

8 Claims, 11 Drawing Figures

LOGIC BOARD

VENDING ORDERING TERMINAL

REFERENCE TO RELATED APPLICATION

This application is a continuation in part of Ser. No. 093,085, filed Nov. 13, 1979, now U.S. Pat. No. 4,300,040 issued Nov. 10, 1981.

BACKGROUND OF THE INVENTION

The present invention relates to a system for selectively previewing, ordering or returning videocassettes or videodiscs, and specifically to a terminal at which such videocassettes can be previewed, ordered, or returned. The term "videocassettes" will hereinafter be sued to refer to videocassettes or videodiscs.

With the rise in popularity of home videocassette players, a market has developed for prerecorded videocassettes for home viewing. Although such videocassettes can be purchased at selected retail outlets, the cost of such videocassettes is high; there are few stores capable of maintaining an inventory in such expensive videocassettes, and such stores are not necessarily conveniently located to a large segment of the populace. It would be desirable to provide a conveniently located terminal at which a user could preview selected videocassettes, could then rent at a relatively low cost and receive such videocassettes and have his rental order charged to a conventional credit card account. It would also be desirable if such a terminal could permit the user to return his videocassettes at the end of the rental period.

It is an object of the present invention to provide such a conveniently located terminal at which a user can selectively preview desired videocassettes.

It is a further object of the present invention to provide such a terminal at which the user can rent and immediately receive the selected videocassettes, and have his rental order credited to a conventional credit card account.

It is a further object of the present invention to provide such a terminal at which the user can return his videocassettes at the end of the rental period.

SUMMARY OF THE INVENTION

In accordance with an embodiment of the present invention, a terminal is provided at which a customer can selectively preview, rent or return desired videocassettes. The terminal includes customer identification means, for example a credit card reader, to receive and process information about the user; display means, for example a videoscreen for displaying instructions to the user and also for previewing the videocassettes; mode selection means, such as a series of decision keys, enabling the user to instruct the terminal at various stages, and cassette selection means, for example a keyboard, which permits the user to select and identify to the terminal the desired videocassette. The keyboard is coupled to a memory which is part of the terminal control, and which receives and stores informaton representative of the desired videocassette. The terminal also includes vending means for storing videocassettes, and for selectively releasing such videocassettes on command.

In addition, the terminal also includes a cassette return means, for receiving a returned videocassette and cassette identification means, for example a scanner, coupled to the terminal control to identify the returned videocassette, and determine its acceptability.

In one embodiment, the previews are continuously run sequentially with both pictures in color and a soundtrack to attract passing viewers.

The terminal may also be used for transactions in which a videocassette may be purchased outright instead of rented. Unless otherwise indicated by the context, as used herein, the term "order" refers to a rental order or an outright purchase order.

To use the terminal, the customer inserts a credit card into the customer identification station. Customer information is then sent to the computer memory, and if the user has inserted a valid credit card, the same is held for the duration of the transaction. The videoscreen then directs the user to press the appropriate decision keys, which instruct the terminal as to whether a videocassette is to be previewed, an order is to be placed, or a videocassette is to be returned.

If a videocassette is to be previewed or ordered, information as to the current available selection is displayed on the monitor, and the user is directed to input into the keyboard the identification number of the videocassette he would like to either preview or order. The videoscreen then directs the user to activate the proper decision key to indicate whether a preview is desired, or whether the user wishes to order a videocassette. If the former, a trailer corresponding to the selected videocassette is displayed on the videoscreen, which the user may terminate by pressing the appropriate decision key. Once the trailer has run, the user has the opportunity to order the videocassette, or begin the process once again.

If the user has indicated that he would like to order a videocassette, the videoscreen "asks" whether the videocassette should be in "Beta" or "VHS" format, and the user inputs his choice by depressing the appropriate decision key. The user may now order or preview additional videocassettes using the same procedure. When the user has finished, he inputs this information into the terminal and the selected videocassette is released. The user retrieves his credit card and obtains a receipt including the appropriate transaction data.

The user wishing to return a videocassette inputs this information into the terminal via the decision keys and inserts the videocassette into the cassette return gate. If this videocassette is acceptable, the terminal retains the returned videocassette and issues a receipt. If not, the videocassette is pushed back through the return chute.

BRIEF DESCRIPTION OF THE DRAWINGS

These and other objects and features of the present invention will be apparent to those skilled in the art from the following description when taken in conjunction with the accompanying drawing in which.

DESCRIPTION OF THE PREFERRED EMBODIMENT

Figure 1:
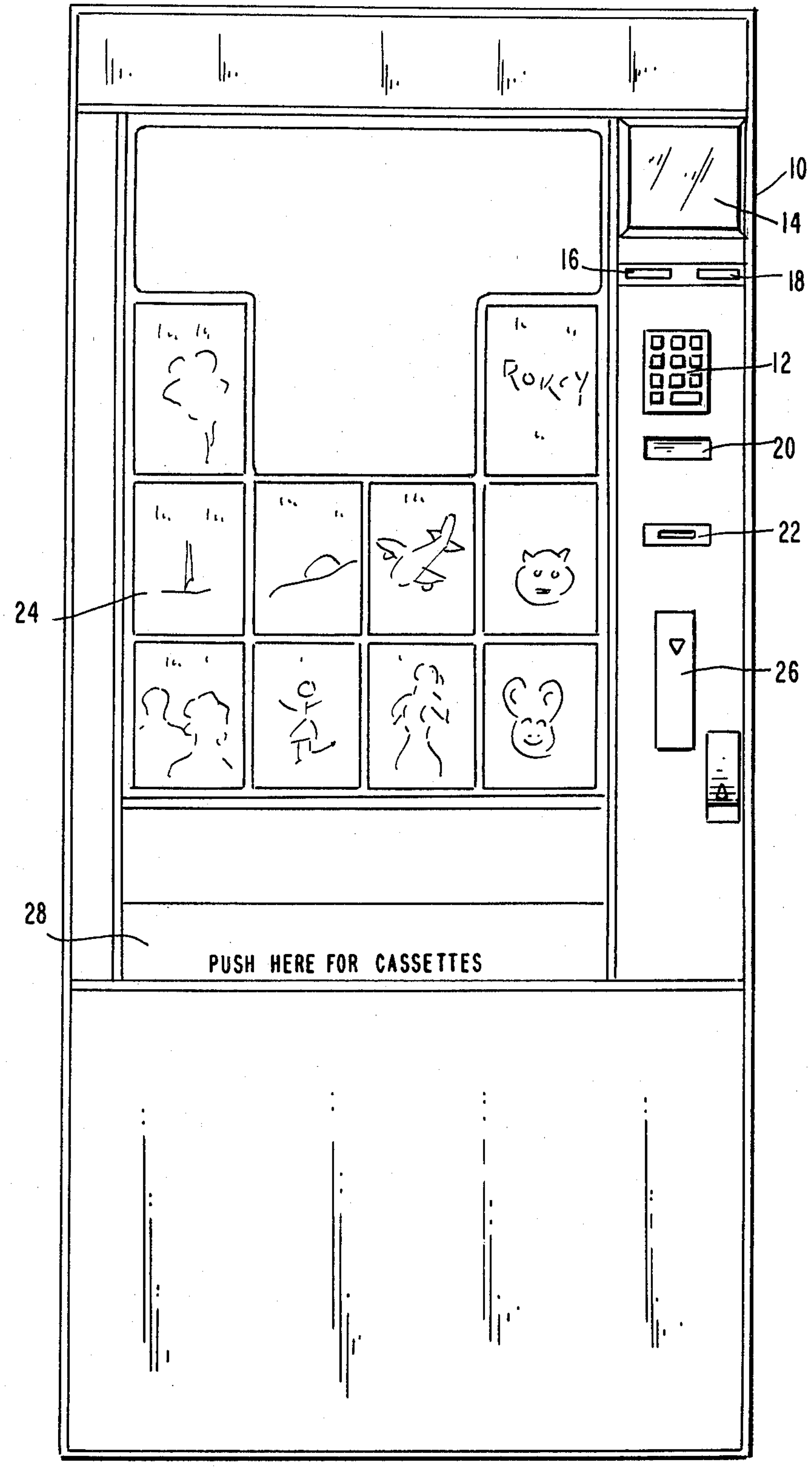
FIG. 1 is a front elevational representation of the terminal of the present invention.

Turning to the drawing, and in particular to FIG. 1 there is provided a typical vending terminal for previewing, ordering or returning a selected videocassette, which is designated generally by the reference numeral 10. Terminal 10 includes a keying station 12, typically a keyboard consisting of a plurality of pushbuttons which can be used to enter a code corresponding to the selected videocassette, and a videoscreen 14 which is used both to display instructions to the user, and also to preview available videocassettes. Located adjacent monitor 14 are decision keys 16, 18 which are positioned to be easily referenceable from monitor 14, and which input to the terminal the several user-generated commands as will be discussed below. Also, included on terminal 10 is a customer information station 20, for example a credit card reader, at which customer information is obtained; a receipt slide 22 for issuing a receipt to indicate an order or a return; and a listing of the available videocassettes together with a code uniquely associated with each such videocassette, as indicated generally by reference numeral 24.

Videocassettes are returned via chute 26, and are vended to the user at bin 28.

Figure 2A:
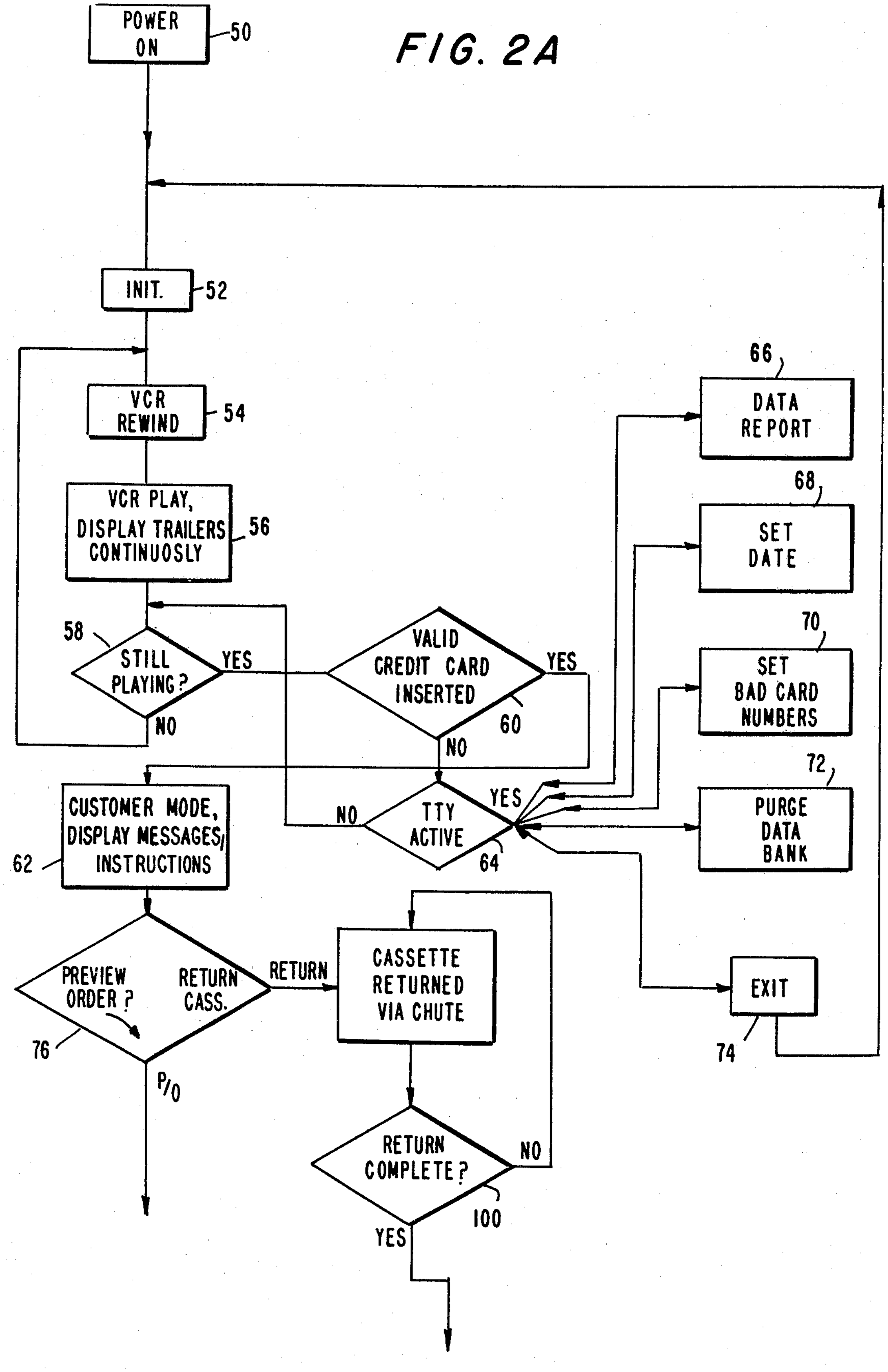
FIGS. 2A–2B is a flow diagram representation describing the sequence of operation of the terminal.
Figure 2B:
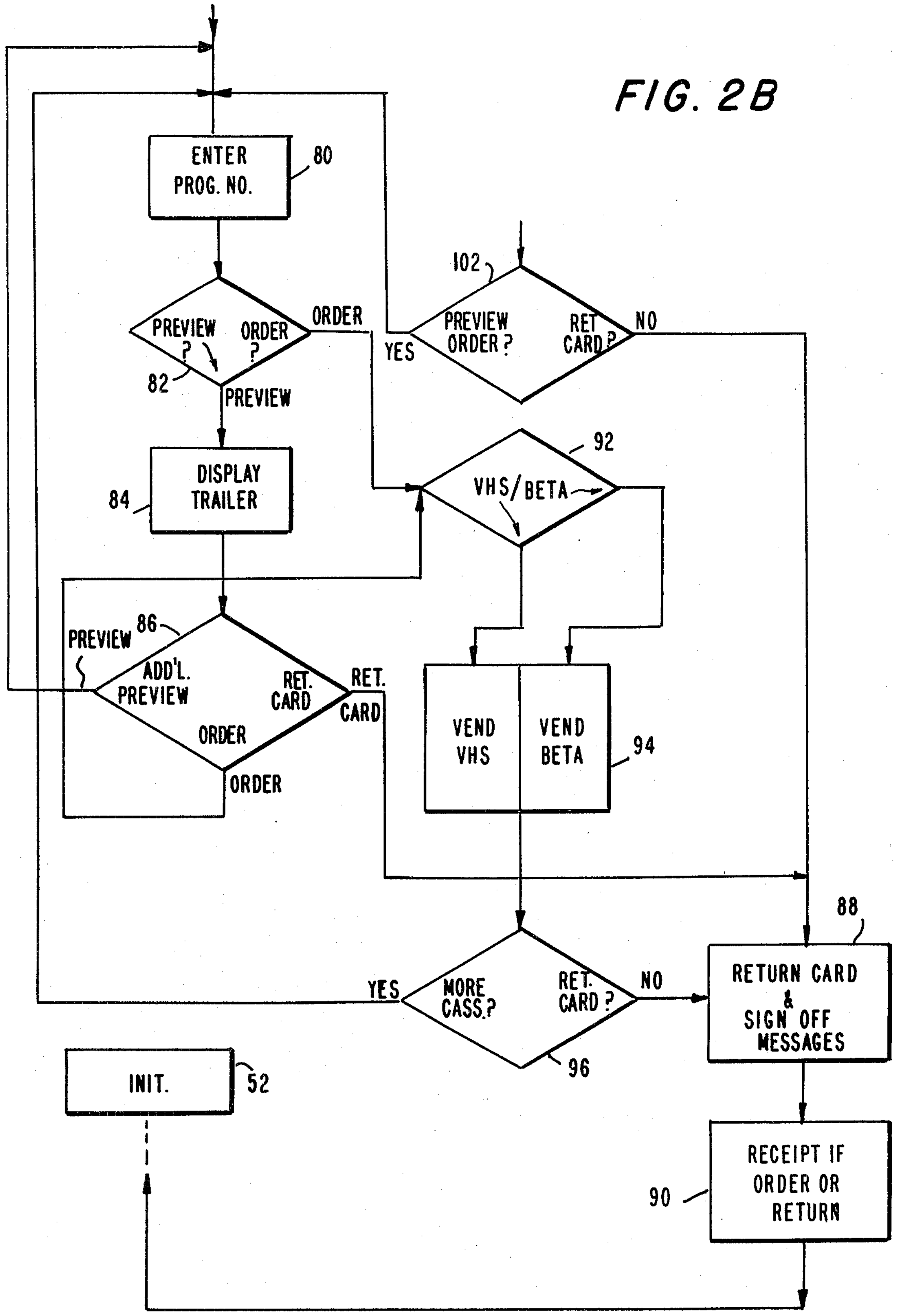

A more detailed understanding of the sequence of operation of terminal 10 can be obtained by reference to FIGS. 2A-2B which is a flow diagram representation of the various steps involved in ordering, previewing or returning selected videocassettes by use of terminal 10.

Referring now to FIGS. 2A-2B, with the power on, as represented by block 50, the system parameters are initialized, as represented by block 52. The videocassette recorder is rewound, as represented by block 54, and videoscreen 14 continuously displays trailers representative of the several available videocassettes, as represented by block 56. If the continuous trailer display is finished, NO answer from block 58, the videocassette recorder is rewound as represented by block 54, and the sequence continues until a credit card is inserted into the card reader 20.

If the credit card inserted is valid, YES answer at block 60, terminal 10 enters the customer mode, and a message directing the user to select the preview or order mode on the one hand, or the return mode on the other hand, is displayed on videoscreen 14, all as represented by block 62.

On the other hand, if the credit card is not valid, NO answer at block 60, the card is returned to the user.

If the user selects the preview or order mode, P/O answer at block 76, a message is displayed onto monitor 14 listing the choice of available videocassettes.

Next, the user enters the desired videocassette number through keyboard 12, as represented at block 80, and inputs via decision keys 16, 18 whether he would like to preview or order the selected videocassette.

If the user has selected the preview mode, PREVIEW answer at block 82, the appropriate trailer is displayed on videoscreen 14, as represented by block 84, and thereafter, a message is displayed on videoscreen 14 directing the user either to choose the previewed title, to select another videocassette for preview, or to receive his credit card back.

If the user desires to preview another videocassette, PREVIEW answer at block 86, a message is displayed directing the user to input a number corresponding to the desired videocassette, as represented by block 80, and the sequence continues through blocks 82, 84 and 86, as described above.

A remote teletype is used by operating personnel to control certain terminal functions. If the teletype has been activated, YES answer at block 64, the videocassette player is stopped, and the remote operator may receive a report of terminal transactions, block 66, set the present date, block 68, enter a list of credit card numbers to be automatically rejected block 70, and/or purge the data bank, block 72. When the operator is finished, the terminal returns to the beginning of the sequence, block 74.

If the user desires to receive his credit card, RET. CARD answer at block 86, the terminal returns the user's credit card, and monitor 14 displays a "sign off" message, all as represented by block 88. If the user has ordered or returned a videocassette, a receipt is generated at slide 22, as represented by block 90, and the system returns to reset the initial conditions, as represented by block 52.

If the user wishes to order a videocassette, ORDER answer at block 86, a message is displayed on videoscreen 14, asking the user whether the videocassette should be in "Beta" or "VHS" format, and the user inputs this information into the system, as represented by block 92. The appropriate videocassette is vended, as represented by block 94, and a message is displayed on monitor 14 asking the user whether he wishes to preview or order another videocassette, or simply get his credit card back. If the user desires to preview or order another videocassette, YES answer at block 96, the sequence returns and continues through block 80 et seq as described above. If the customer wishes to receive his credit card back, NO answer at block 96, the credit card is returned, videoscreen 14 displays a "sign off" message, block 88, and a receipt is generated, as represented by block 90. Again, the sequence returns to reset the parameters as represented by block 52.

If instead of previewing or ordering a videocassette, the user desires to return a previously rented videocassette, RETURN answer at block 76, a message is displayed on videoscreen 14, directing the user to place the returned videocassette in return chute 26, and the user does so as represented by block 98. When the return is completed, YES answer at block 100, a message is displayed on videoscreen 14 directing the user to either preview or order another videocassette, or have his credit card returned. If the user selects to preview or order another videocassette, YES answer at block 102, the system returns to point A, and the sequence is repeated as described above.

On the other hand, if the user simply desires to have his credit card returned, NO answer at block 102, the card is returned and videoscreen 14 displays a "sign-off" message, as represented at block 88. A receipt is generated as represented by block 90, and the terminal returns to reinitialize the parameters, as represented by block 52.

Figure 3:
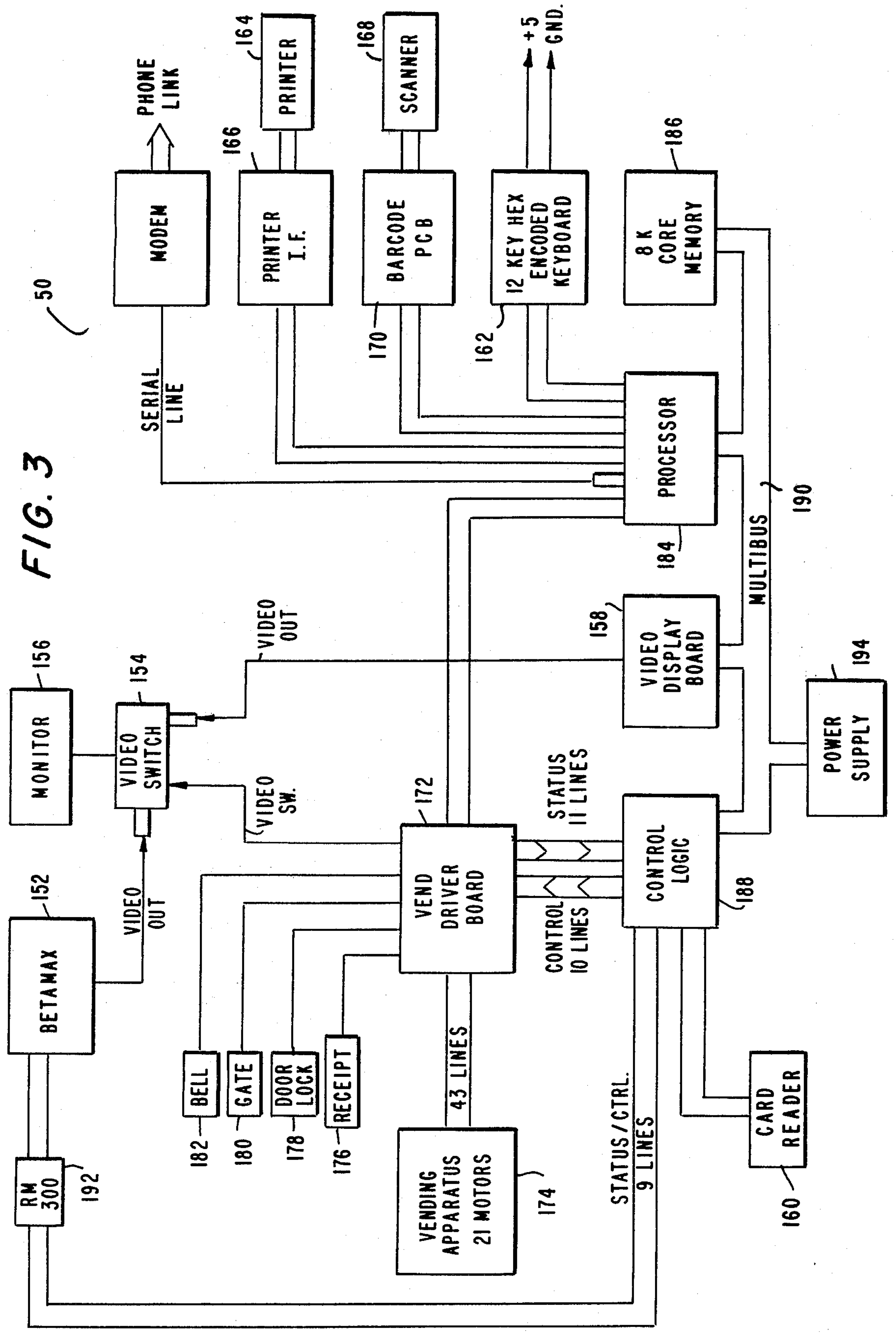
FIG. 3 is a block diagramatic representation of the internal electronic control system for the terminal.

Turning to FIG. 3, there is provided a block diagramatic representation of the internal elements of terminal 10. It will be understood that a worker skilled in the art will readily comprehend the operation of each of the individual components and how these components are functionally interconnected to provide an operative terminal. It is also understood that the various components and the system configuration are shown for illustrative purposes only and that other components can be used as would be known to a worker skilled in this art. Therefore, the following will not provide an unnecessarily lengthy description of the operation of the system shown in FIG. 3.

Turning to FIG. 3, the overall ordering terminal is generally designated by the reference numeral 150, for example on Automatic Products Model 435 modified as will be discussed below. Terminal 150 includes a tape player 152, such as a Sony Betamax SLT-300 coupled through videoswitch 154 to an 8″ color video monitor, such as a Sony PVM-8000 8″ color monitor, which function together to provide the video display to preview the available videocassettes. Also coupled to videoscreen through videoswitch 154 is video display board 158, such as a Matrox MTX-1632 display system which provides a 16 line X 32 column alpha-numeric video display which is displayed by monitor 156, so as to display instructions and information enabling the user to operate the terminal.

Terminal 150 also includes card reader 160, such as AMP Model 210-211, which serves to receive and read ABA format credit cards to activate the terminal. Terminal 150 also includes a 12-key encoded keyboard 162, which allows the user to communicate the number of the desired videocassette to terminal 150; printer 164, driven by printer interface module 166, which issues a printed receipt for orders or returns, and scanner 168, activated by interface module 170, which scans the returned videocassette for proper identifying information, as will be discussed below.

The actual vending operation, i.e., the dispensing of videocassettes is directed by vend driver board 172, which includes certain control logic, which will be discussed below, and which controls vending apparatus 174 which in turn is operable to retain and selectively release videocassettes on command. Vend driver board 172 also controls the receipt paper cutter 178, which cuts the receipt generated by printer 164 from a roll of paper, door lock 178 which is unlockable to permit user access to a vended videocassette, returned cassette gate 180 which accepts a returned videocassette into the terminal, and bell 182 which signals the end of a transaction.

An MSC-8001 Computer 184 having 8K core memory 186 supervises the operation of the entire terminal 150 through system control logic 188 which is interconnected with computer 184 through multibus 190. Multibus is a trademark used by Intel Corporation for an interconnecting backplane assembly. System control logic 188 also controls a remote control unit 192, for example, a Sony RM-300, which interfaces between system control unit 188 and video tape player 152. Power is supplied via power supply 194.

System control logic 188 required to control the operation of terminal 150 would be readily apparent to a worker skilled in this art based upon the foregoing descriptions. Further, the system control logic 188 will vary upon the particular components selected for terminal 150. However, to provide some guidance for the design of said control logic 188, reference should be made to FIGS. 4A–B, 5A–B, 6A–B and 7. Since the construction and operation of the circuits shown in FIGS. 4A–B, 5A–B, 6A–B and 7 will be readily apparent to a worker skilled in the art, only selected parts of the operation and construction of these circuits will be highlighted.

Figure 4A:
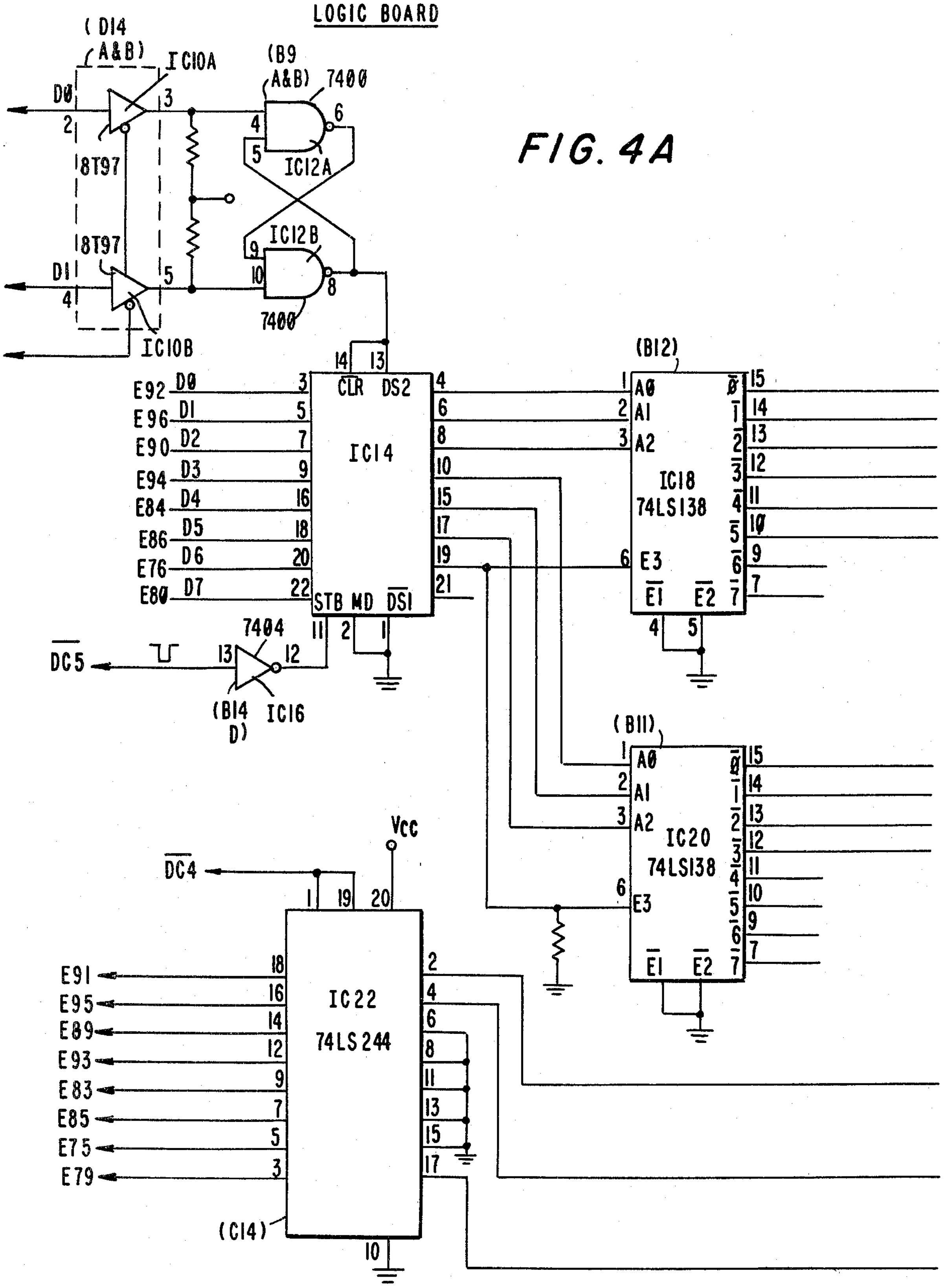
FIGS. 4A–4B is a circuit diagram of the control logic for controlling the operation of the vending control means used in conjunction with the vending means to distribute selected videocassettes.
Figure 4B:
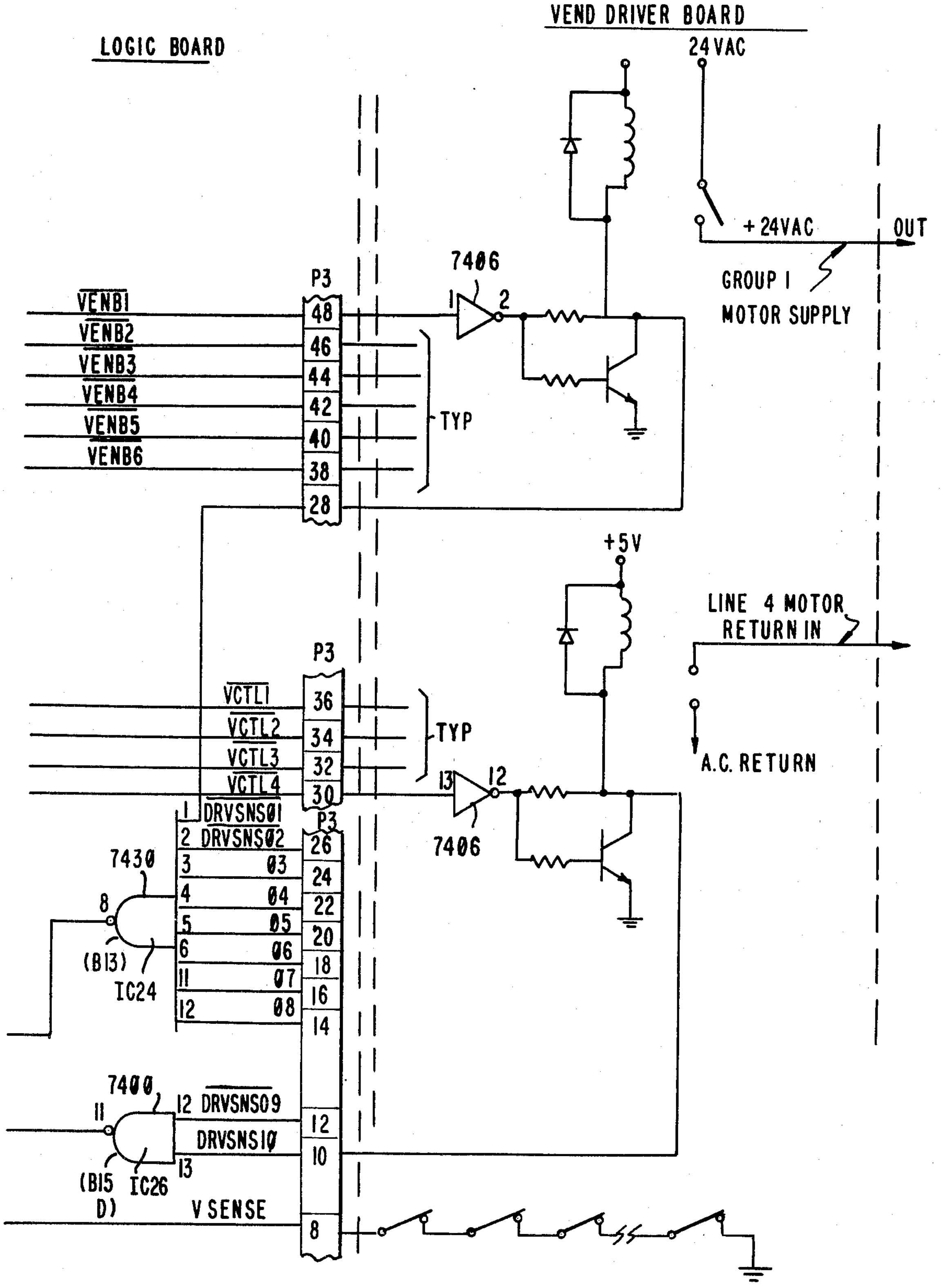

Turning to FIGS. 4A–4B, there is provided circuit logic for controlling vend driver board 172. When computer 184 commands control logic 188 to cause a videocassette to be vended, an appropriate command is generated by logic elements IC10A,B and IC12A,B to enable latch IC14.

The address of the selected videocassette is input into latch IC14 and is thereafter decoded by decoders IC18 and IC20, which in turn generate appropriate signals along lines VENB1–6 and VCTL1–4, for ultimate transmission, via connector P3 to vend driver board 172. See FIGS. 5A–5B.

Information with respect to the current status of the vending motors is transmitted via lines DRVSNS1–10 and VSENSE through buffer IC22. A positive signal along line VSENSE indicates that a vending motor has rotated 360° (i.e., has vended one videocassette). Driver sense lines DRVSNS1–10 are anded together at gates IC24 and IC26 and this information is transmitted to buffer IC22 to enable computer 184 to monitor the condition of the vending motors.

Figure 5A:
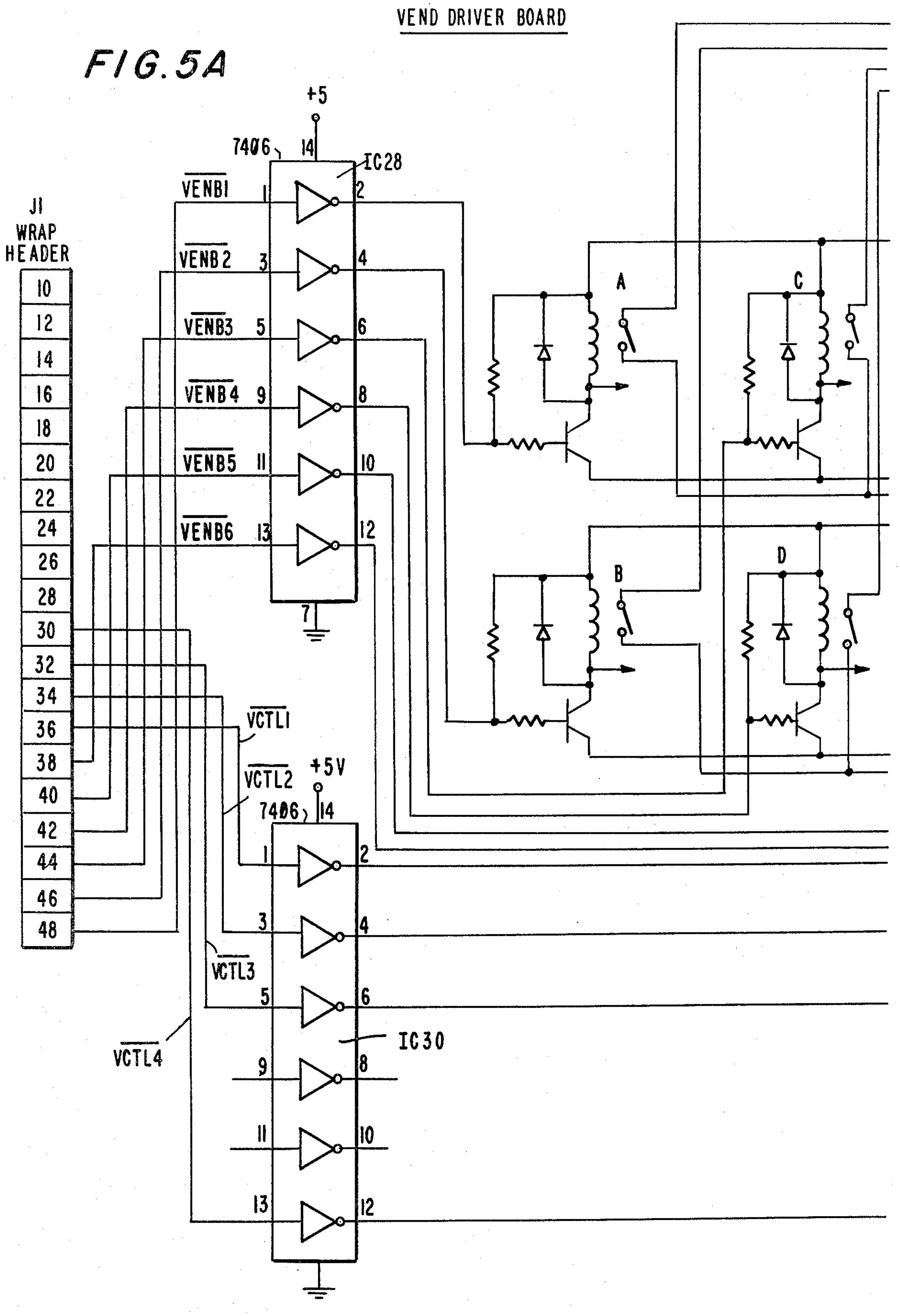
FIGS. 5A–5B is a circuit diagram of the vending means itself.
Figure 5B:
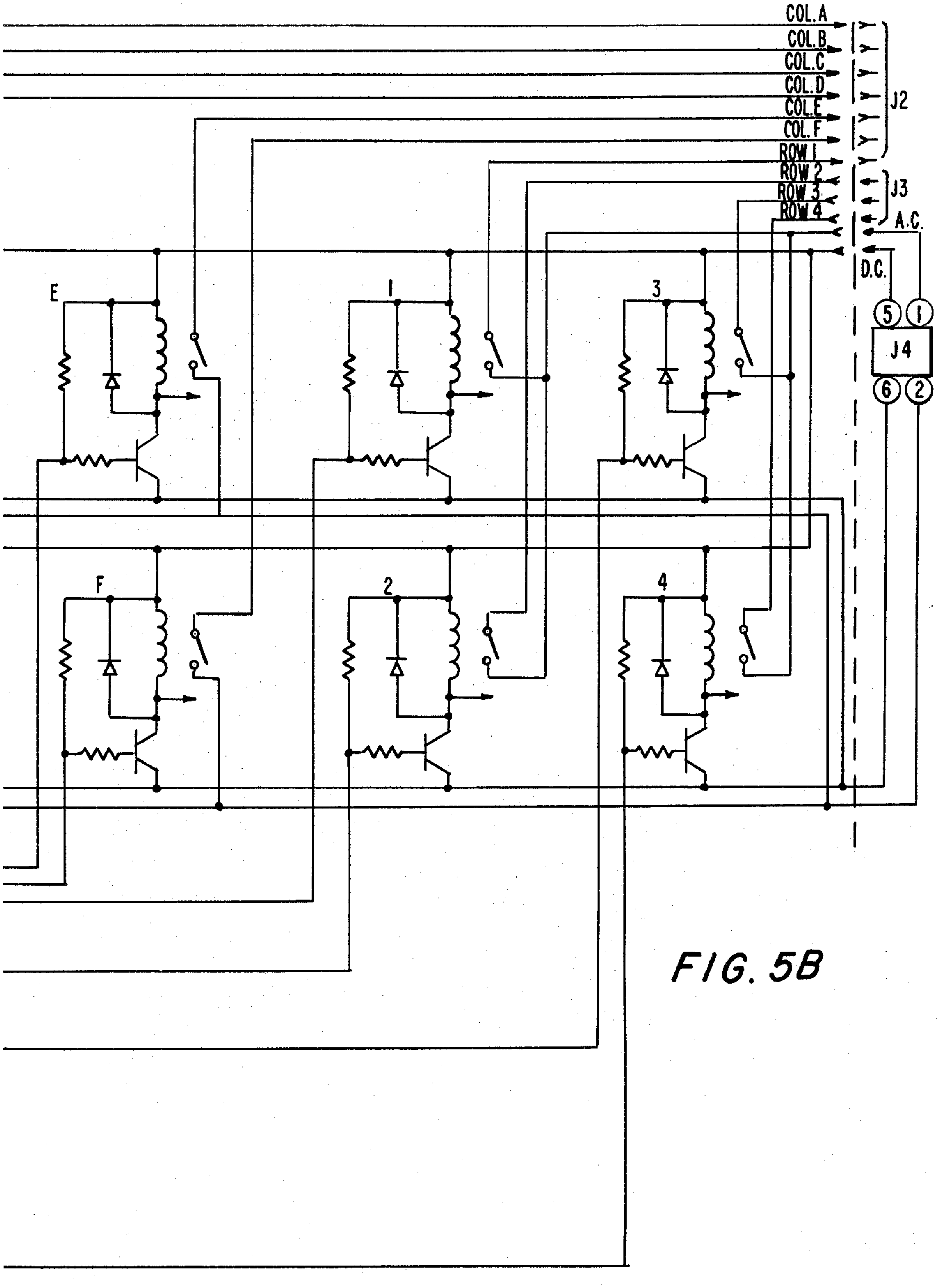

Turning to FIGS. 5A–5B, which shows the logic included in vend drive board 172 as well as the circuitry for vending apparatus motors 174, the address of the videocassette to be vended is accessable at connector J1. As determined by this address, lines VENB1–6 route a 24-volt AC signal through latch IC28, through one of drive circuits A–F, to one of six columns of vending apparatus motors 174. Similarly, depending again on the address of the videocassette to be vended, lines VCTL1–4 transmit an AC return signal through latch IC30 and drive circuits 1–4 to one of four rows of vending apparatus motors 174, thus in combination generating a matrix address selecting one of the 24 vending apparatus motors 174 from which to vend the selected videocassette.

Figure 6A:
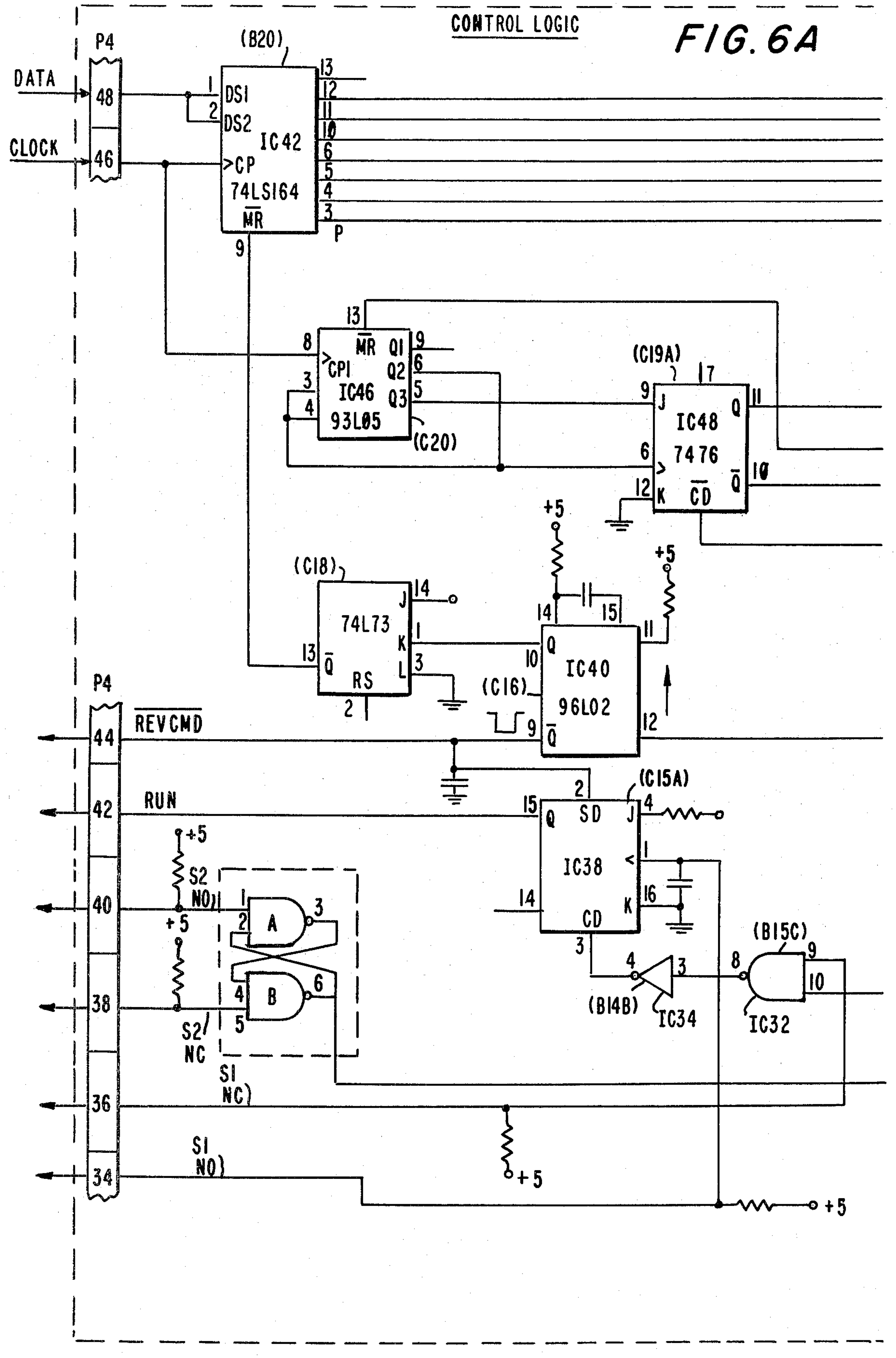
FIGS. 6A-6B is a circuit diagram of the control logic for controlling the card reader used to receive and process customer identification information.
Figure 6B:
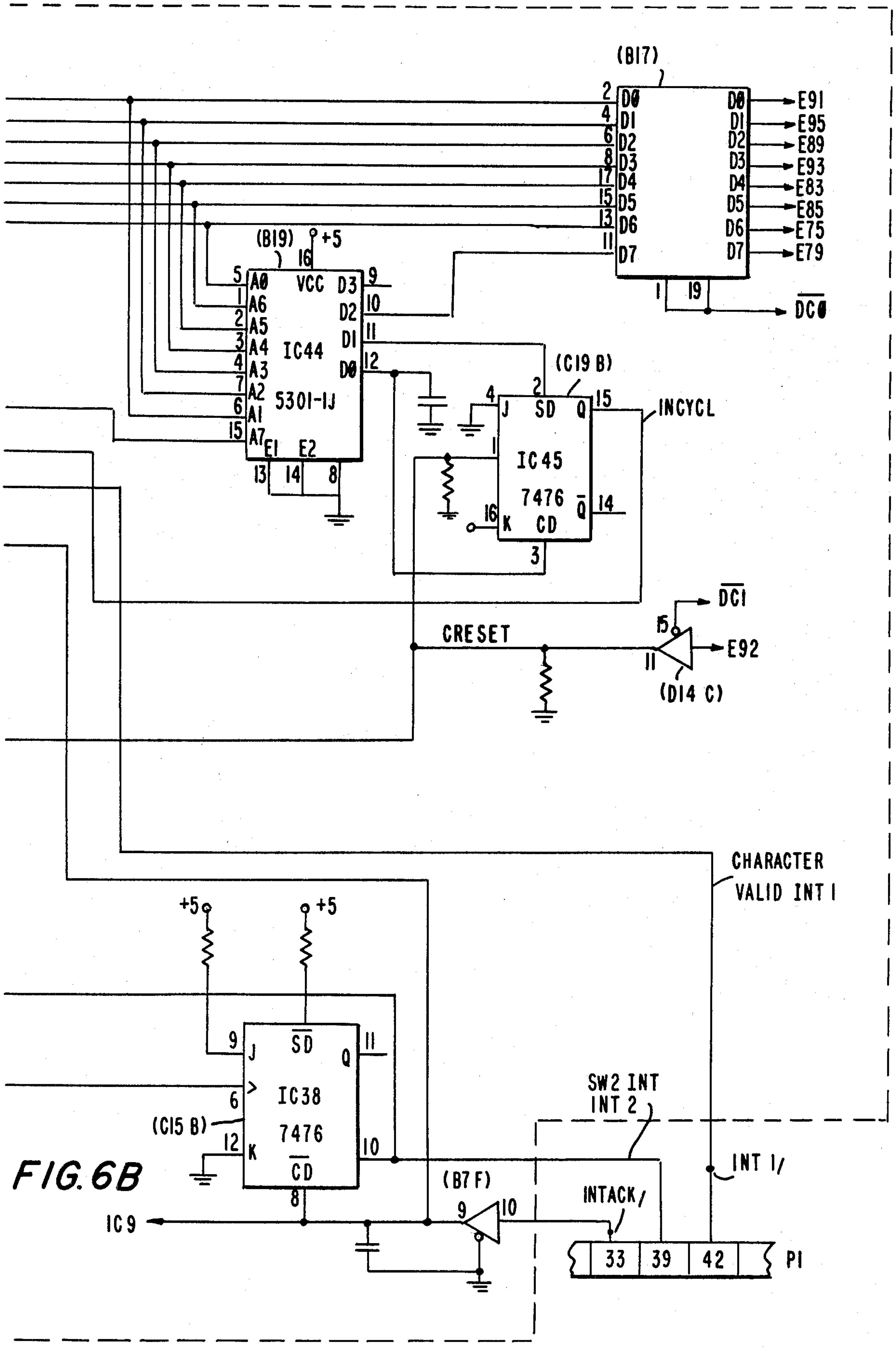

Turning to FIGS. 6A–6B, there is shown the circuit for controlling card reader 160. This circuitry consists of two subsections, a transport and control subsection and a serial to parallel converter. The card reader transport control is activated by initially inserting an ABA format plastic card into slot 20 on the face of terminal 10. This sets switch S1 in card reader 160 and the logic formed by IC32, IC34 and IC36 engages the card and begins driving it over the read head. The setting of S1 also enables completion interrupt logic IC38. When the card is completely read, switch S2 is set, which clears the "run" logic leaving card inside card reader 160 until the end of the transaction, and generates a completion interupt telling computer 184 that a card has been read. When the card is to be returned, computer 184 commands IC40, causing both a "run" and a "reverse command" to be sent to the reader, driving the card back out to the user. When the card is completely clear, switch S1 disengages, stopping carder reader 160.

The card reader electronics provides a serial TTL data stream and a TTL clock pulse. These signals load 8 bit shift register IC42, which permits reading of both four bit and six bit data characters, as the card is read. The outputs of shift register IC42 are fed continuously to logic element IC44, which, when detecting an appropriate data or control word, sets flip flop IC45 and counter IC46, interrupting computer 184, informing it that the valid card data will be available. As each data bit is clocked into shift register IC42, it is counted by IC46. When five or seven bits (four or six data bits and one parity bit) have been counted, IC46 sets IC48 generating a strobe pulse that allows computer 184 to read the data words.

Figure 7:
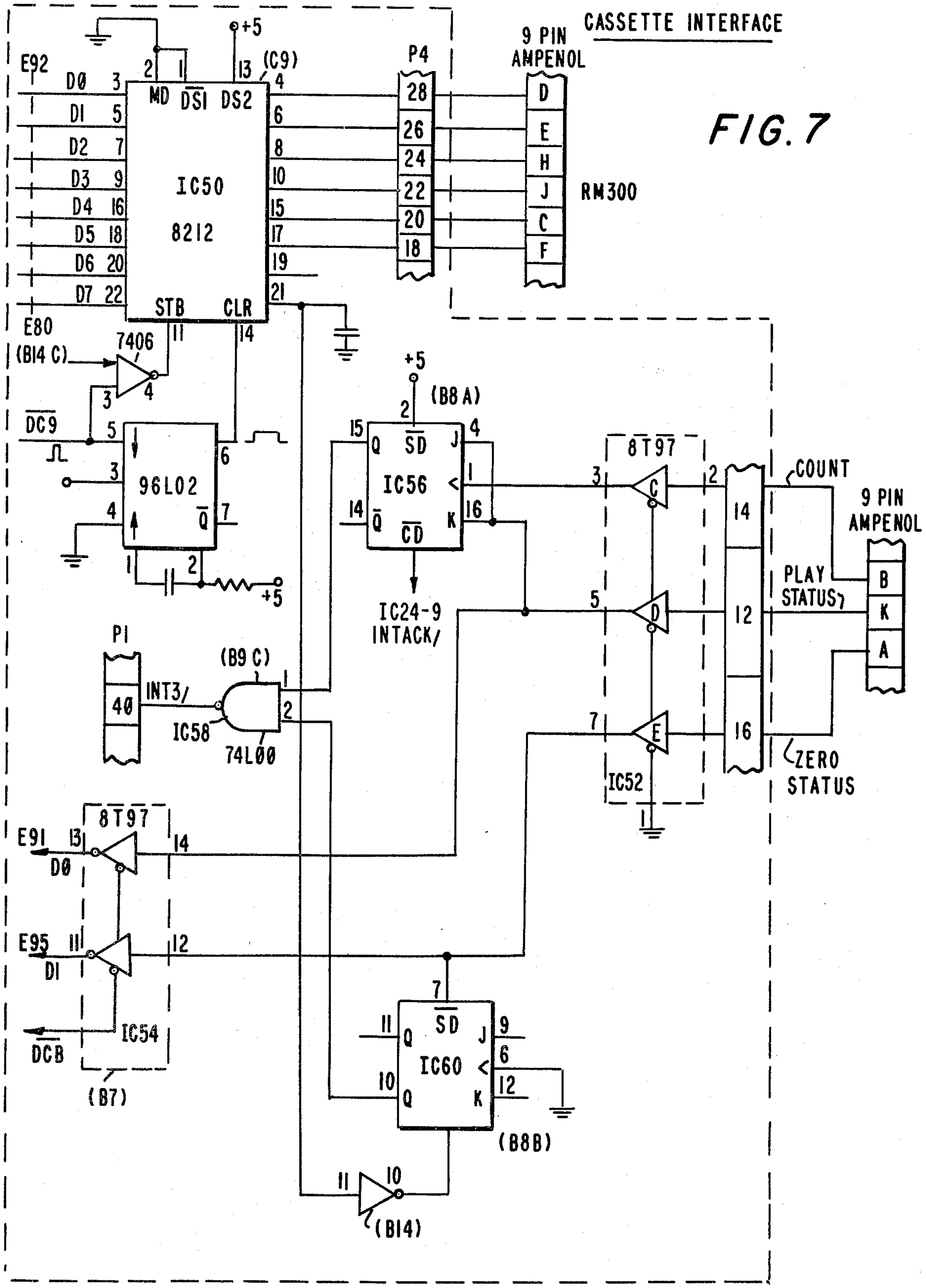
FIG. 7 is a circuit diagram of the control logic for controlling the operation of a typical videocassette playback unit used to preview videocassettes.

Turning to FIG. 7, which shows the logic for controlling videotape player 152 via a modified Sony RM remote control unit 192, a four-digit BCD tape address, corresponding to the location of the beginning of the appropriate trailer, is sent to remote control unit 192, via output latch IC50 as is a "search and play" command.

When the videocassette recorder 152 reaches the proper tape address, it begins playing, and the trailer is shown over monitor 156, and the "play" status is read into computer 184 via buffer IC54. When recorder 152 is in the "play" status, counting flip flop IC56 is enabled, and when the count has reached the level indicating that the desired trailer length has been played, a "stop/-clear" command is issued, recorder 156 stops, and the "play" status line goes back to zero.

IC52 provides buffering for status information generated by remote control unit 192 to allow computer 184 to determine if videocassette recorder 152 is in the play mode, to count control track pulses from the tape, and to determine if the counter value is equal to zero, i.e., if the tape has been rewound.

For videocassette recorder 152 to play and preview videocassettes uninterruptedly, the count interrupt function may be disabled at Gate IC58 by zero status flip flop IC60, until it is reenabled by a new "search and play" command issued from IC50.

In addition to the logic described in FIGS. 4, 5, 6 and 7, modifications were also made to the Sony RM-300 remote control unit and the MSC-8001 computer. The Sony RM-300 unit was modified in two ways:

1. Changes were made to allow the RM-300 to accept commands directly from the computer instead of from its own keyboard.
2. Logic lines indicating counter-0, play status, and control track pulses were made available.

All of the above lines were brought out to an external connector for interfacing with the CPU.

The MSC-8001 Computer was modified as follows:

1. The multibus "NMI/" line (Non-Maskable Interrupt) was replaced with an "Intack/" line (interrupt acknowledged). This function formed by the logical OR of the processor "Ml/" and CIORQ/ "signals" allows the CPU to inform an interrupting device that the interrupt has been received.

The direction of parallel port 2C, bit 5 from computer 184 was reversed. This line, although hardwired as an output line, was unusable as such and was needed to provide status information to the processor from the RM-300.

All of the above modifications are well within the ordinary skill in this art and further details of these modifications are unnecessary.

The overall operation of the Automatic Products Company Model 435 vending machine is described in the instruction manual provided for the same, and will not be discussed in detail. However, the same was modified mechanically to make the motor hold switches compatable with the overall computer logic, and for other reasons. In addition, a return chute 26 was added permitting the return of videocassettes. The modifications made to this machine would be apparent to those skilled in the art and will not be further discussed.

Additional changes and modifications to the embodiments of the invention as described herein can also be made, as will be apparent to those skilled in the art, while still remaining in the spirit and scope of the disclosed invention as set forth in the accompanying claims.

What is claimed is:

1. A terminal at which a user can selectively preview or order a videocassette, said terminal comprising, customer identification means for receiving information relative to the user; mode selection means enabling the user to choose a preview or order mode; cassette selection means for selecting and identifying a desired videocassette; terminal control means including a memory coupled to said customer identification means and said cassette selection means to receive and store information representative of the user, the data, and the selected videocassettes; vending means for storing a plurality of videocassettes and for selectively vending the selected videocassette; vending control means coupled to said terminal control means for communicating said information between said memory and said vending means to command the vending of the selected videocassette when the order mode has been selected; and preview display means coupled to said terminal control means for receiving said information and displaying a trailer corresponding to the selected videocassette when the preview mode has been selected.

2. A terminal in accordance with claim 1, further including return means for receiving and selectively rejecting a returned videocassette; scanning means coupled to said terminal control means for identifying the videocassette and storing information representative of the videocassette in said memory; and return control means coupled to said terminal control means for communicating said information between said memory and said return means to selectively reject the videocassette.

3. A terminal at which a user can selectively preview, order or return videocassettes, said terminal comprising, customer identification means for receiving information relative to the user; mode selection means enabling the user to choose a preview, order or return mode; cassette selection means for selecting and identifying a desired videocassette; terminal control means including a memory coupled to said cassette selection means to receive and store information representative of the selected videocassette; vending means for storing a plurality of videocassettes and for selectively vending the selected videocassette; vending control means coupled to said terminal control means for communicating said information between said memory and said vending means to command the vending of the selected videocassette when the order mode has been selected; preview display means coupled to said terminal control means for receiving said information and displaying a trailer corresponding to the selected videocassette when the preview mode has been selected; return means for receiving and selectively rejecting a returned videocassette when the return mode has been selected; scanning means coupled to said terminal control means for identifying the videocassette and storing information representative of the videocassette in said memory; and return control means coupled to said terminal control means for communicating said information between said memory and said return means to selectively reject the videocassette.

4. A terminal in accordance with claims 1–3, wherein said preview display means is adapted to successively display a plurality of trailers, representative of several videocassettes.

5. A terminal in accordance with claims 1, 3, wherein said preview display means includes a videocassette playback device coupled to a television monitor.

6. A terminal in accordance with claims 1, 2 and 3, further including credit card validating means coupled to said customer identification means, for transmitting to a remote location information relative to credit cards submitted by the user.

7. A terminal at which a user can selectively order or return a videocassette, said terminal comprising: customer identification means for receiving information relative to the user; mode selection means enabling the user to choose an order or return mode; cassette selection means for selecting and identifying the desired videocassette; terminal control means including a memory coupled to said cassette selection means to retrieve and store information representative of the selected videocassette; vending means for storing a plurality of videocassettes and for selectively vending the selected videocassette; vending control means coupled to said terminal control means for communicating said information between said memory and said vending means to command the vending of the selected videocassette when the order mode has been selected; return means for receiving and selectively rejecting a returned videocassette when the return mode has been selected; scanning means coupled to said terminal control means for identifying the videocassette and storing information representative of the videocassette in said memory; and return control means coupled to said terminal control means for communicating said information between said memory and said return means to selectively reject a videocassette.

8. A terminal to which user can return a videocassette which has previously been dispensed from said terminal or a comparable terminal, said terminal comprising: return chute means for receiving and selectively rejecting the videocassette; scanning means for identifying the videocassette; terminal control means including a memory coupled to said scanning means to receive and store information representative of the videocassette; and return control means coupled to said terminal control means for communicating said information between said memory and said return means to selectively reject the videocassette.

* * * * *